Patented Jan. 10, 1950

2,494,240

UNITED STATES PATENT OFFICE 2,494,240

DYESTUFFS OF THE ANTHRAQUINONE SERIES

Ernst Gutzwiller, Basel, Switzerland, assignor to Sandoz Ltd., Basel, Switzerland, a Swiss firm No Drawing. Application March 18, 1947, Serial No. 735,544. In Switzerland September 30, 1943

Section 1, Public Law 690, August 8, 1946
Patent expires September 30, 1963

4 Claims. (Cl. 260—374)

The present invention relates to new green dyestuffs of the anthraquinone series and to a process for their manufacture and is in part a continuation of my copending Patent No. 2,448,094 of August 8, 1948.

I have found that new very fast green dyestuffs of the anthraquinone series can be prepared by first condensing anthraquinone compounds containing in the positions 1 and 4 replaceable atoms or groups and further containing in the positions 6 and 7 halogen atoms, with aromatic bicyclic amines and by subsequently sulfonating the resultant condensation products.

For the manufacture of the intermediate products use may be made of compounds, such as 6.7-dichloroquinizarine, 1.4-diamino-6.7-dichloranthraquinone, 1.4-aminohydroxy-6.7-dichloranthraquinone, 1.4-aminomethoxy-6.7-dichloranthraquinone, 6.7-dibromoquinizarine, 6.7-chlorobromoquinizarine, 6.7-chlorobrom-1.4-hydroxyaminoanthraquinone, 6.7-dibrom-1.4-diaminoanthraquinone and the like. The starting products can be used for the condensation either as such or in form of their leuco compounds, whereby preferably a mixture consisting of the leuco compound and of the unreduced compound is used for the condensation. The leuco compound can be prepared during the condensation by adding to the reaction mass a reducing agent like hydrosulfide, zinc powder and the like.

As further starting products I can use 1.4-methoxy-nitro-6.7-dihalogenanthraquinones, 1.4-hydroxynitro - 6.7 - dihalogenanthraquinones, 1.4.6.7-tetrahalogenanthraquinones and 1-methoxy-4.6.7-trihalogenanthraquinones. In cases where the positions 1 and/or 4 are occupied by halogen atoms, the condensation is carried out preferably in the presence of a catalyst, like copper powder or a copper compound and of an acid binding agent, like sodium or potassium acetate, sodium-, potassium- or calcium carbonate and the like.

The aromatic bicyclic amines I use for the condensation are for instance 1- and 2-naphthylamine, 1- and 2-amino-5.6.7.8-tetrahydronaphthalene, aminodiphenyls, like 4-amino-diphenyl, 4.4'-aminodiphenylcarboxylic acid ethyl ester, aminodiphenyl ethers, like 4- or 3-aminodiphenyl ether, aminodiphenyl methanes, aminodiphenyl sulfides and similar compounds. The condensation itself is carried out preferably in the presence of solvents, like ethanol, propanol, butanol, amyl alcohol, benzyl alcohol, cyclohexanol, methylcyclohexanol, pyridine and the like. Of course, the aromatic bicyclic amines, when used in an excess can also act as solvent. The condensation is preferably carried out at temperatures between 70 and 220° C. according to the nature of the starting products used. If leuco compounds are used as such or in admixture with the unreduced anthraquinone compound, the reaction product obtained consists of the leuco base or contains a more or less great quantity of leuco base. These leuco compounds can be oxidised in the reaction mass by means of a current of air, if necessary in the presence of some piperidine and copper acetate, pyridine, triethanolamine or any other basic acting substance. The dyestuff base is then isolated, if necessary after addition of ethanol, by filtration and washing with ethanol and water. It is also possible to isolate first the leuco base or the mixture of the base with the leuco base and to oxidise the same in a high-boiling solvent, such as pyridine, aniline, dimethylaniline, nitrobenzene and the like, at an elevated temperature with a current of air and to allow the base to crystallize out on cooling down or to precipitate it by means of ethanol and some sodium hydroxide solution. Generally I prefer to work in such a manner that the condensation product does not contain any appreciable quantity of the leuco compound and in such a manner that, after the condensation, the dyestuff base can be separated by usual methods.

A further feature of the present invention is the transformation of the condensation products which are water-insoluble into valuable water-soluble green dyestuffs by treating the dyestuff bases with sulfonating agents, like concentrated sulfuric acid, sulfuric acid monohydrate, fuming sulfuric acid or chlorosulfonic acid. The dyestuffs thus obtained are isolated in the usual manner and they dye wool, silk, nylon and other similar textiles in very fast green shades.

The following examples, without being limitative, illustrate the present invention, the parts being by weight:

Example 1

20 parts of leuco-6.7-dichlorquinizarine, 30 parts of 6.7-dichlorquinizarine, 18 parts of boric acid and 300 parts of 1-amino-5.6.7.8-tetrahydronaphthalene are stirred at 100–150° C. until the condensation is finished. If necessary the leuco base still present is oxidised by means of a current of air, preferably in the presence of some piperidine and copper acetate. The charge is cooled down to 80° C., 250 parts of ethanol being then added thereto and the precipitate filtered still warm, washed with hot ethanol and hot water. The base which is obtained in form of dark crystals and which can be recrystallized from organic solvents, like aniline, nitrobenzene or dimethylaniline, is soluble in organic solvents with a green coloration and is the 1.4-di-(5'.6'.7'.8' - tetrahydro - 1' - naphthylamino) - 6.7-dichloranthraquinone.

10 parts of the condensation product thus obtained are dissolved in 5–8 times its weight of oleum containing 5–10% SO₃ and stirred at 15-45° C. until a test taken out shows that it is completely water-soluble. The dyestuff thus produced is isolated in the usual manner; it dyes wool in yellowish-green shades of very good fastness properties.

Instead of 6.7-dichlorquinizarine and leuco-6.7-dichlorquinizarine respectively one can use 6.7 - dichlor - 1.4 - hydroxyaminoanthraquinone; 6.7-dichlor-1.4-diaminoanthraquinone or their leuco compounds respectively, whereby the identical dyestuff will be obtained.

Instead of the starting products used in this example 6.7-dibromoquinizarine or its leuco compound, or 6.7-chlorobromoquinizarine or its leuco compound can be used, whereby the corresponding halogenated derivatives will be obtained.

Instead of using a great excess of 1-amino-5.6.7.8-tetrahydronaphthalene one can use a much smaller quantity and work in the presence of a diluting agent, such as for example methylcyclohexanol, amyl alcohol, butyl alcohol and the like.

Example 2

7 parts of leuco-6.7-dichloroquinizarine, 10 parts of 6.7-dichloroquinizarine, 7 parts of acetic acid 85%, 2 parts of boric acid and 90 parts of 2 - amino - 5.6.7.8 - tetrahydronaphthalene are stirred at 100-105° C. until no further reaction can be observed. After diluting with 60 parts of ethanol, the charge is filtered at 60-65° C., washed first with hot ethanol and then with hot water. The beautifully crystallized reaction product, which is the 1.4-di-(5'.6'.7'.8'-tetrahydro-2'-naphthylamino) - 6.7 - dichloranthraquinone is soluble in organic solvents with a green coloration.

10 parts of the reaction product are dissolved in 40 parts of sulfuric acid monohydrate, then 30 parts of oleum containing 28% SO₃ are added thereto and the charge stirred at 40-45° C. until a test shows that the whole is water-soluble. After cooling down the charge is poured into 250 parts of a 5% sodium chloride solution, filtered, again suspended in 200 parts of a 5% sodium chloride solution, neutralized, filtered and dried. The dyestuff thus obtained dyes wool in very fast brilliant green shades.

Example 3

30 parts of 1.4.6.7-tetrachloranthraquinone, 20 parts of potassium acetate, 180 parts of 2-amino-5.6.7.8-tetrahydronaphthalene and 3 parts of copper acetate are stirred at 160-220° C. until the condensation is finished. The charge is cooled down to 90° C., then 150 parts of ethanol are added thereto and the whole is filtered, washed first with hot ethanol and then with hot water. The dyestuff base can be purified by crystallisation from aniline. The 1.4-di-(5'.6'.7'.8'-tetrahydro-2'-naphthylamino) - 6.7 - dichloranthraquinone is soluble in organic solvents with a green coloration. After sulfonation a dyestuff will be obtained that dyes wool in fast green shades and which is identical with the dyestuff of Example 2.

Example 4

10 parts of leuco-6.7-dichloroquinizarine, 15 parts of 6.7-dichloroquinizarine, 5 parts of boric acid, 75 parts of 4-aminodiphenyl and 150 parts of methylcyclohexanol are stirred at 100-160° C. until the condensation is complete. After cooling down to 90° C. the charge is diluted with 150 parts of ethanol, filtered still hot and successively washed with hot ethanol and hot water. The base thus obtained can be recrystallized from a high boiling organic solvent and is the 1.4-di-(4'-biphenylylamino) - 6.7-dichloranthraquinone. It is soluble in organic solvents with a green coloration.

10 parts of the dyestuff base are dissolved in 4 to 7 times its weight of sulfuric acid 95-100% and stirred at 40-45° C. if necessary after addition of a small quantity of fuming sulfuric acid containing 28% SO₃, until a test is completely soluble in water. The dyestuff is isolated in the usual manner and dyes wool in very fast green shades.

Example 5

9 parts of leuco-6.7-dichloroquinizarine, 13 parts of 6.7-dichloroquinizarine, 5 parts of boric acid, 60 parts of 4-aminodiphenylether, 10 parts of acetic acid 90% and 160 parts of amyl alcohol are stirred together at 100-130° C. until the condensation is finished. After diluting with 150 parts of ethanol the charge is filtered at 70° C., washed successively with hot ethanol and hot water and dried. If necessary, the dyestuff base can be purified by crystallisation. For this purpose 10 parts of the base are dissolved for instance in 100 parts of aniline, heated at 160-170° C. for a short time, allowed to cool down to 80° C. and treated at the latter temperature with 50 parts of ethanol and 4 parts of caustic soda lye 30%. After filtration at 70° C. the precipitate is washed successively with hot ethanol and hot water. The dyestuff base thus obtained is 1.4-di-(4'-phenoxyphenylamino)-6.7-dichloranthraquinone and is soluble in organic solvents with a green coloration.

10 parts of this dyestuff base are dissolved in 4 to 7 times its weight of sulfuric acid 93-100% and stirred until a test became water-soluble. The dyestuff is isolated in the usual manner and dyes wool in fast green shades.

Similar dyestuffs can be obtained by using for the sulfonation dyestuff bases, like 1.4-di-(4'-thiophenoxy-phenylamino) - 6.7 - dichloranthraquinone, 1.4-di-(4'-benzylphenylamino) - 6.7-dichloranthraquinone, 1.4-di - (4'-phenoxyphenylamino)-6.7-dibromanthraquinone, 1.4-di-(4'-cyclohexylphenylamino) - 6.7 - dichloranthraquinone and 1.4 - di - (4'-phenyl-3'-methylphenylamino)-6.7-dichloranthraquinone.

Example 6

7 parts of leuco-6.7-dichloroquinizarine, 10 parts of 6.7-dichloroquinizarine, 3 parts of boric acid, 6 parts of acetic acid 80%, 60 parts of 2-naphthylamine and 80 parts of amyl alcohol are stirred together at 100-130° C. until the condensation is finished. At a temperature of 80° C. 80 parts of ethanol are added and the charge is filtered at about 70° C., washed with hot ethanol and hot water. The base thus obtained is then heated with 500 parts of hydrochloric acid 5% at 90-95° C., filtered still hot, washed until neutral and dried. The base thus obtained can, if necessary, be recrystallized from high boiling organic solvents. The 1.4-di-(2'-naphthylamino)-6.7-dichloranthraquinone thus obtained is soluble in organic solvents with a green coloration.

10 parts of this dyestuff base are dissolved in 4 to 8 times its weight of sulfuric acid 95-100% and stirred until a test is completely soluble in water. The dyestuff isolated in the usual manner dyes wool in fast green shades.

Example 7

7 parts of leuco-6.7-dichloroquinizarine, 10 parts of 6.7-dichloroquinizarine, 3 parts of boric acid, 30 parts of 1-naphthylamine, 70 parts of amyl alcohol and 4 parts of acetic acid 80% are stirred together at 125–130° C. until the condensation no longer proceeds. At 80° C. 50 parts of ethanol are added and filtered at a temperature of 70° C. and then the product is washed successively with hot ethanol and hot water. After purification from hot aniline, ethanol and some caustic soda lye the 1.4-di-(1'-naphthylamino)-6.7-dichloranthraquinone is sulfonated by a treatment with sulfuric acid 95–100%. The dyestuff dyes wool in green shades.

What I claim is:
1. The anthraquinone dyestuff of the formula

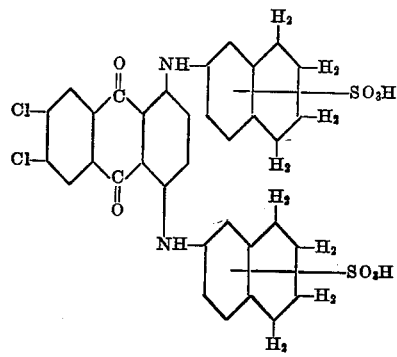

which dyes animal and synthetic nitrogen-containing fibres into fast green shades.

2. The anthraquinone dyestuff of the formula

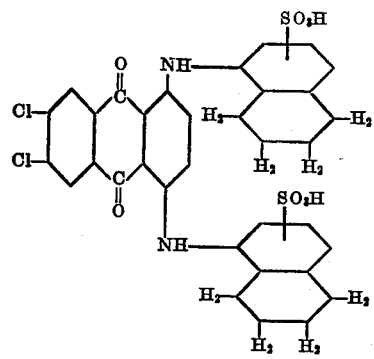

which dyes animal and synthetic nitrogen-containing fibres into fast green shades.

3. An anthraquinone dyestuff of the formula

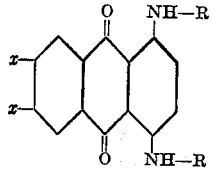

wherein X stands for a member selected from the group consisting of chlorine and bromine, and wherein R is a univalent radical selected from the group consisting of 1-(ar-sulfo,5,6,7,8-terahydro)-naphthyl, 2-(ar-sulfo,5,6,7,8-tetrahydro)-naphthyl, 1-(4-sulfophenoxy)-phenyl, 1-(4-sulfophenyl)-phenyl and 1-(4-cyclohexyl)-sulfophenyl, the R radicals being identical.

4. The anthraquinone dyestuff of the formula

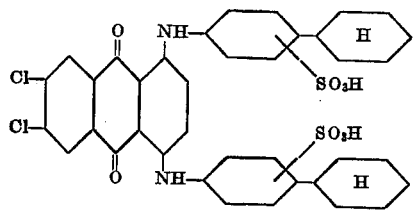

which dyes animal and synthetic nitrogen-containing fibres into fast green shades.

ERNST GUTZWILLER.

REFERENCES CITED

The following references are of record in the file of this patent:

UNITED STATES PATENTS

| Number | Name | Date |
|---|---|---|
| 2,042,757 | Zahn et al. | June 2, 1936 |
| 2,315,788 | Gutzwiller | Apr. 6, 1943 |
| 2,377,145 | Gutzwiller | May 29, 1945 |